Figure 3:
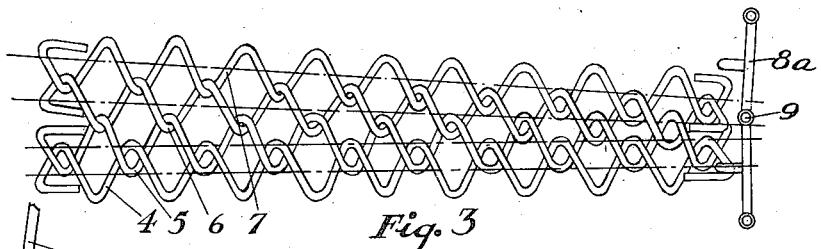

March 31, 1942.  E. D. RAPISARDA  2,278,361
CONVEYER
Filed Sept. 30, 1937  3 Sheets-Sheet 1

INVENTOR
EDWARD D. RAPISARDA
BY
*George B Willcox*
ATTORNEY

March 31, 1942. E. D. RAPISARDA 2,278,361
CONVEYER
Filed Sept. 30, 1937 3 Sheets-Sheet 3

Inventor
EDWARD D. RAPISARDA
By George B. Willcox
Attorney

Patented Mar. 31, 1942

2,278,361

UNITED STATES PATENT OFFICE 2,278,361

CONVEYER

Edward D. Rapisarda, Saginaw, Mich., assignor to Baker Perkins Company, Inc., Saginaw, Mich., a corporation of New York Application September 30, 1937, Serial No. 166,635

4 Claims. (Cl. 198—182)

This invention relates to band-type conveyers and has for its principal object the provision of a novel wire-mesh belting particularly adapted for use in arcuate conveyer runs or in applications combining straight and laterally curved runs, as in endless sorting-table and cooling conveyers.

A further object of the invention is to provide improved conveyer mechanisms incorporating the novel wire-mesh material, which shall be mechanically simple, durable, and reliable as compared with conveyers for similar uses employing fabric belts, slats, and the various other structures heretofore employed, and which are particularly adapted to handling delicate goods without injury.

An important field for the use of substantially flat conveyers traveling through curved or semicircular paths has been the food and confectionery industries. For example, in the manufacture of chocolate coated confections and biscuits by automatic machinery it is necessary to provide a substantial length of conveyer to permit cooling and solidifying of the chocolate upon the freshly coated centers. In order to bring the overall length of a cooling plant of this kind within economical limits it is necessary to double the path of the goods upon itself and deliver the goods near their starting point. In cooling plants of this type straight-run endless wire or fabric bands have been used to carry the goods through cooling enclosures or tunnels, and the change in direction has been effected by so-called turntables which receive the goods from one linear conveyer, carry them through the desired arc, usually 180°, and deliver it onto a second linear conveyer traveling oppositely to the first.

The 180 degree turn-tables heretofore used for this purpose consisted of a disc of canvas webbing folded diametrically over the edge of a semi-circular table. Its upper working face was caused to rotate about its axis adjacent the edge of the table by frictional engagement with power-driven rollers spaced about its outer edge. The localized impositive driving action of the frictional rollers stretched the peripheral edge of the canvas, developing puckers and looseness, so that after a period of use the canvas band would tend to slip from under the drive rollers and stop. In the enclosed ducts of candy-cooling systems if the turn-table thus stopped accidentally goods would continue to be fed onto it from the straight conveyer. Confections would be piled up at that point, causing extensive loss of goods, and smearing the conveyer surface with coating material before the stoppage would be discovered and the feeding conveyer shut down. To minimize these costly stoppages frequent replacement of the expensive canvas has been required.

The present invention makes possible the construction of an improved turn-table for this purpose, in which the conveyor surface is positively driven, virtually eliminating the shut-downs described; is much longer lived than the friction-driven fabric heretofore employed; and which, by reason of its open mesh, contributes to the cooling of the goods, and is less apt to damage soft materials by adhesion than is canvas or other closely woven fabric.

An additional feature of the invention in the so called turn-tables, or direction-changing conveyers, is that it is possible to equalize momentarily the linear speeds of the inner and outer portions of the arcuate conveyer at the point of transfer of goods to and from the associated straight run. In other words, the invention permits matching speeds of the conveyers perfectly throughout their width. This has of course been impossible with turn-tables of canvas or other materials which are relatively inelastic and in which localized differences in speed would necessarily produce ripples or wrinkling. Scuffing or pinching of the goods between two conveyer surfaces traveling at different speeds at a transfer point is entirely obviated by my novel turn-table.

Figure 4:
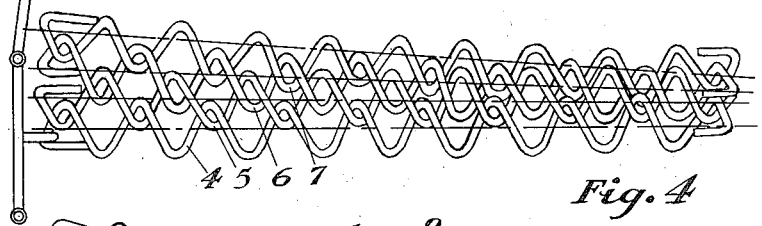
Figure 5:
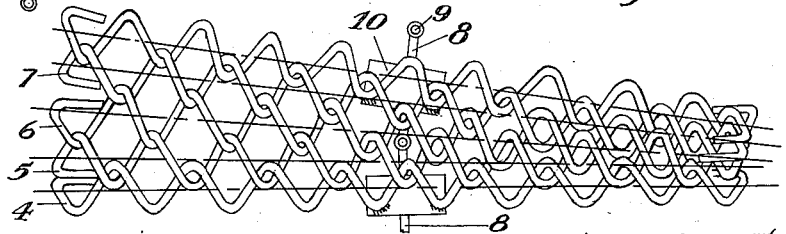
Figure 1:
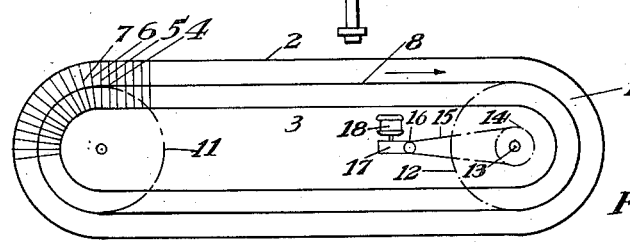
Figure 6:
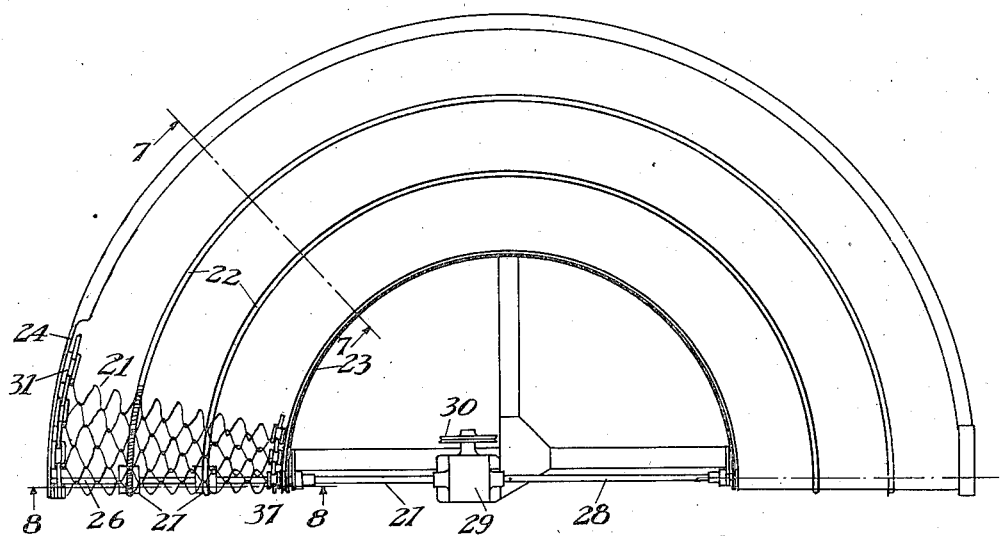
Figure 7:
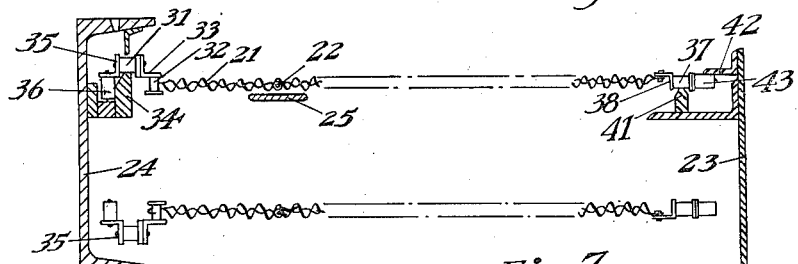
Figure 8:
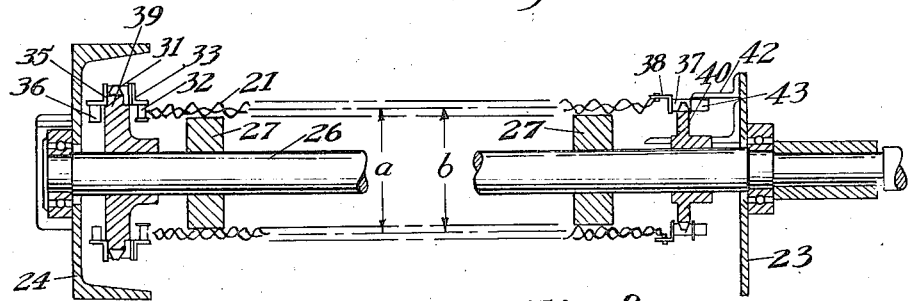
Figure 9:
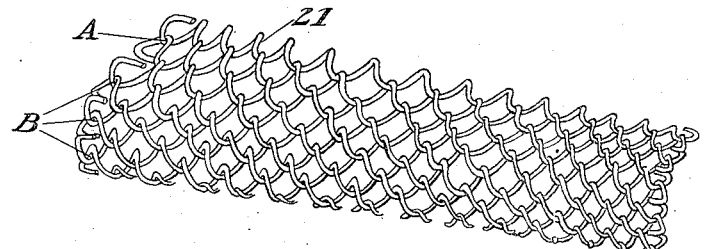
Figure 10:
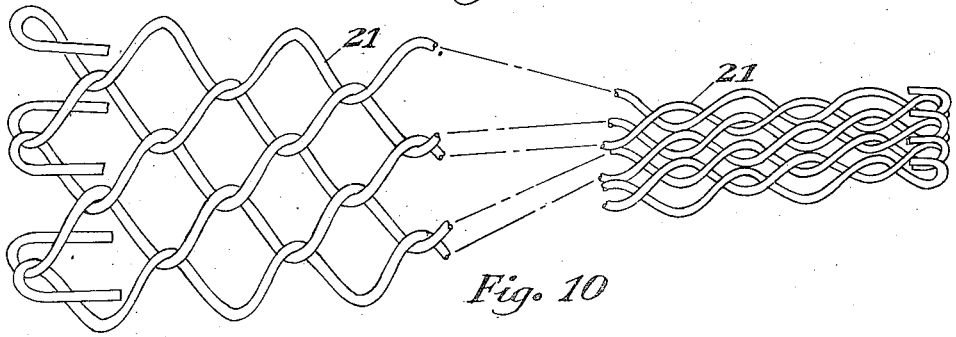
Figure 11:
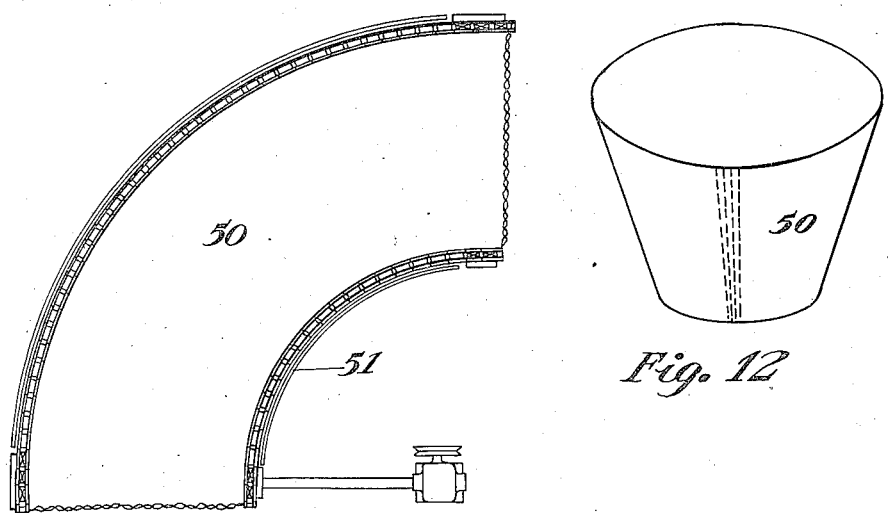
Figure 12:
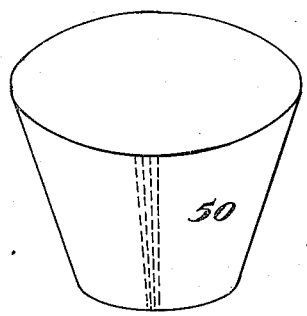

Other features and advantages of the improved conveyer band are described in the following specification, and specific embodiments of the invention are illustrated in the accompanying drawings, in which:

Fig. 1 is a diagrammatic representation of a sorting table embodying the invention, Figs. 2 through 5 are enlarged views showing the details of construction of the wire-mesh conveyer band as used in the apparatus of Fig. 1, and various modes of attaching it to the chain which drives it, Fig. 6 is a top plan view of a turn-table according to the invention, for reversing the direction of travel of goods between two other oppositely traveling conveyers, not shown, Fig. 7 is a transverse vertical section taken along line 7—7 in Fig. 6, Fig. 8 is a vertical section taken along line 8—8 of Fig. 6, Fig. 9 is a diagrammatic representation of a portion of a modified wire-mesh band according to the invention, showing its action as it passes around a cylindrical nosing of a turn-table as shown in Figs. 6 through 8, Fig. 10 is an enlarged view of the conveyer mesh band of Figs. 6 through 9, adjacent its lateral edges, Fig. 11 is a diagrammatic plan view of a direction-changing conveyer similar to that of Fig. 6, but designed to turn the goods it carries through 90, instead of 180 degrees, and Fig. 12 shows diagrammatically the form of the conveyer band of Fig. 11 before it is assembled in the machine.

Figure 2:
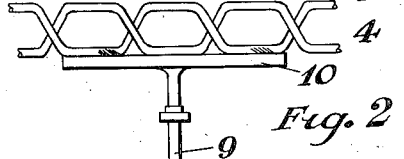

One application of a conveyer band according to the invention is shown diagrammatically in Fig. 1. The conveyer sorting table illustrated comprises an endless mesh band 1 supported upon lateral tracks or rails 2 and 3, which form a part of a flat framework suitably supported at table height. The endless band 1 travels along tracks 2 and 3 in a substantially planar path, driven by an endless chain 8 positioned slightly below and between tracks 2 and 3. Chain 8 consists of links having their pintles 9 vertical. As shown in Figs. 2 and 5, at spaced intervals, for example at every third or fourth link, a horizontal plate or bar 10 is secured to one of the pintles 9. One of the crimped rods 4, 5, 6, or 7 of the mesh band is spot welded, or otherwise suitably secured to each such plate 10.

At the opposite end of the sorting table sprockets 11 and 12 are mounted horizontally, concentric with the semi-circular portions of rails 2 and 3 at the ends of the sorting table. The shaft 13 of sprocket 12 carries a driving sprocket 14 which is coupled by a chain 15 to sprocket 16 of a reduction gear 17, which is driven by a motor 18.

Rotation of sprocket 12 gives to chain 8 a linear travel around the sorting table, carrying with it the endless band conveyer 1. The conveyer band travels freely around the curved portions of its path because of its novel construction, which is shown in detail in Figs. 3, 4, and 5. The band consists of a plurality of interwoven crimped rods 4, 5, 6, 7 of stiff wire or other suitable material. Each wire is crimped helically, as shown, and may be more or less flattened, as in Fig. 2, to present a flat surface to the goods, or for reasons of compactness. Regardless of the particular style of crimping employed, each rod presents alternate oppositely directed lateral bights of uniform lead, and, in the figures referred to, of uniform pitch throughout their length. The rods are threaded into one another, so that each bight is interlocked with an opposing bight of an adjacent rod.

So far as described, the wire is the same as has been used for conventional belting intended for linear runs. The mesh band of this invention differs from the earlier material referred to in that the ends of the rods are not crimped into small closed loops, but as shown, are crimped in open loops or bights of substantially the same depth or pitch as the bights intermediate the ends of the rods.

Figs. 3, 4, and 5 illustrate diagrammatically the action of a portion of a conveyer so made at a point where it turns from a straight run into an arcuate path. In each of the views the two lowermost runs 4 and 5 lie in a linear run of the conveyer, as shown in Fig. 1, while the rods 6 and 7 above have passed into a curved portion of the track, as at either of the sprockets 11 and 12. In each instance the rods 6 and 7 have accommodated themselves to the arcuate travel by spreading at their outer ends, or approaching each other at their inner ends, or by a combination of the two relative motions, depending upon the location of the driving chain to which they are attached.

Figs. 3 through 5 illustrate also three possible locations of the driving chain in a sorting table of this general kind.

In Fig. 3 the chain 8a is shown connected to the inner edge of the conveyer band (adjacent to rail 3 in Fig. 1).

Fig. 4 shows a driving chain 8b connected to the band at the outer peripheral edge of a sorting table as in Fig. 1, adjacent to track 1.

Fig. 5 shows the arrangement of conveyer and drive chain shown in Figs. 1 and 2 in which the chain 8 lies between tracks 2 and 3 and is connected to the rods of the mesh band intermediate their ends.

In Fig. 3, rods 4 and 5, as indicated by the broken center lines, are shown in a straight conveyer run just adjacent an arcuate run. Rods 6 and 7 lie in this arcuate path, as indicated by their divergent center lines. The driving chain 8a is attached to the band at intervals along its inner peripheral edge. Since the spacing of the chain links is fixed, the band must adjust itself to its arcuate travel entirely by a spreading of its crimped rods and an increase in its length along its outer peripheral edge. In a straight run, therefore, the crimped rods 4 and 5 are normally condensed or collapsible upon each other as shown, so that they may be extended sufficiently to permit the required amount of spreading along the outer edge of the band when they travel arcuately. The required depth of crimping, or pitch of the rods, and the extent to which they are thus pre-condensed in linear travel, is determined by the width of the band and the radius of the conveyer path.

In Fig. 4, rods 4 and 5 are illustrated as they appear in a straight run of the conveyer, while links 6 and 7 are shown entered upon an arcuate path, the same as described in connection with Fig. 3. The drive chain 8b is here attached along the outer peripheral edge of the conveyer. Under these circumstances no collapsing of the outer lateral edge can take place to accommodate a change of direction of the conveyer from linear to arcuate, or vice versa. Consequently when traveling upon an arcuate path the conveyer near its inner periphery must be collapsible to the extent necessary to accommodate the different speeds of the outer and inner edges. Accordingly in a linear run the inner ends of rods 4 and 5 are extended or drawn apart to substantially the full extent permitted by the pitch of their crimping. Rods 6 and 7 which have entered an arcuate path are collapsed at their inner ends to their fullest extent, effecting the necessary shortening of the inner peripheral edge of the conveyer.

Fig. 5 shows a preferred location of the driving chain with respect to the mesh band, as indicated also in Fig. 1. Chain 8 is located as nearly as possible at what may be called the neutral zone taken transversely of the conveyer—that is to say, it is located at that point between the inner and outer ends of the rods 4, 5, 6, 7, at which neither collapsing nor expansion takes place when the conveyer changes its direction of travel. With this construction, in passing from the straight into an arcuate run, the outer edge of the conveyer is extended to a moderate amount, and its inner edge is moderately collapsed. Accordingly in a straight run, rods 4 and 5 are spaced along the drive chain 8 so that their interlocked bights are intermediate their fully extended and fully collapsed positions. On passing into a curved path, as shown by rods 6 and 7, this play is taken up by full extension of the rods at their outer ends, while the inner ends are fully collapsed.

The sorting table of Fig. 1, incorporating the conveyer band described is mechanically simple and inexpensive to construct, as compared with conveyers of tapered slats heretofore built for the purpose. The single chain 8 driven as shown, handles the band in all parts of its travel, and for handling the usual moderate loads, no auxiliary driving elements are needed to prevent localized operating stresses, stretching, or overloading the conveyer. It tends to run perfectly flat without sagging or distortion, due to the many interlocking bights which serve to spread the driving load, from the points where the mesh is attached to the drive chain through the linked rods laterally to the margins of the band.

Figs. 6 through 10 inclusive show an application of a modified form of the wire-mesh belting of the invention. An annular conveyer consists of laterally extending wire rods 21, which are helically crimped from end to end. The rods however, differ from those of the band just described in that the bights formed by crimping are progressively increased in pitch from the inner to the outer edge of the band, so that the lateral boundaries of each wire diverge, presenting a tapered appearance. While crimped wire of uniform pitch may be employed in this turn-table, tapering the rods permits the construction of a circular band of minimum radius. The wires 21 are loosely interlocked at each crimp presenting a mesh conveyer band similar to that of the sorting table just described, and the turned-in outer ends of adjacent rods are bent alternately up and down so that they may pass each other when the edge of the band is collapsed. The endless band is also provided with one or more circumferential coil springs 22 threaded through the meshes of the band which by their tension counteract any tendency of the mesh to buckle and maintain a flat surface.

The annular band just described is folded in half over a semi-circular frame, comprising an arcuate member 23 at the inner edge of the band and a member 24 adjacent the outer edge. One or more semi-circular flat tracks 25, as shown in Fig. 7, are provided between the edges of the band to support the mid-section of its upper working half. At its substantially horizontal diametric fold the band passes over a cylindrical nosing at each side. The idle lower half of the band is supported by suitable tracks or guiding members not shown to prevent undue sagging of the belt.

A preferred form of nosing shown in Fig. 8 consists of a shaft 26 journaled at its ends and provided with a plurality of cylindrical rollers 27 of equal diameter which support the mesh band intermediate its edges. The shafts 26 at their inner ends are coupled to a pair of drive shafts 27 and 28 which are driven at identical speeds in opposite directions by a geared transmission 29, which is coupled to a motor, not shown, by a belt from pulley 30.

The conveyer is driven from shaft 26 by a circumferential drive chain 31 attached around the outer edge of the band, as shown in detail in Figs. 7 and 8. The chain is of the well-known roller type articulated vertically and horizontally to enable it to travel around the outer arc of the frame, as well as over the nosing. At suitably spaced intervals along the chain depending lugs 32 support the wires. The lugs 32 are secured to the horizontal pintles of chain 31 by angle brackets 33.

A rail 34 is secured to the inside of the frame member 24 providing a semi-circular guide and support for the drive chain 31. Referring to Fig. 7, rail 34 is of substantial height and is fixed at its lower edge in spaced relation to the frame member 24. It thus offers a horizontal track for the links of the chain and provides a vertical guiding surface facing outward.

Angle brackets 35 extending horizontally outward are secured to pintles of the chain 31, at or near each of the conveyer attachment lugs 32. Rollers 36 are journaled to travel on the vertical outer face of the rail and hold the chain 31 and the conveyer band in place against inward tension and the driving forces. At each nosing of the turn-table the chain 31 passes over a drive sprocket 39 fixed to shaft 26.

The diameter of sprocket 39 is greater than that of the nosing cylinders 27, since it is proportional to the diameter of the turn-table at the outer edge, while cylinders 27 are proportional in diameter to the diameter of the inner edge of the band. Sprockets 39 thus determine the speed of travel of the chain 31 and the outer edge of the conveyer in the flat arcuate run and the speed of the mesh over the nosing throughout its width is determined by rolls 27, and is equal to the rate of arcuate travel of the inner edge of the band. At the inner radius of the band a second chain 37 may be provided, attached by angle brackets 38 to the inner edge of the mesh. A second sprocket 40 of the same diameter of rolls 27 is provided at the inner end of each nosing shaft 26. An arcuate track 41 for the inner chain 37 is fastened to the upright inner frame member 23. If the conveyer is to carry heavy loads, a second horizontal guiding track 42 may be provided, spaced above the track 41. Some or all of the pintles of the chain 37 are elongated and provided with idler rollers 43 extending radially inward to engage the under surface of the guiding track 42, preventing localized loads on the mesh from tilting the chain off of track 41.

In many practical applications of the mechanism the inner sprocket 40 and the chain 37 and its guide tracks may be dispensed with, the inner edge of the conveyer simply passing over an idler roller or cylinder similar to No. 27 in Fig. 8.

The semi-circular turn-table described is installed at the end of a straight-line conveyer, not shown, to receive goods discharged from that conveyer, carry them through an arc of 180 degrees, and discharge them onto a second conveyer traveling in the reverse direction. In practice the two linear conveyers feeding onto and receiving from the turn-table are driven at identical speeds and the circumferential speed of the nosing roll 27 and the inner edge of the band is synchronized therewith. Consequently the outer edge of the band in its arcuate path travels at a speed considerably higher than do the associated linear conveyers. However, when the band passes over either nosing, the speed of its outer edge is reduced to that of the inner edge.

The end of the conveyer feeding onto the turn-table is located so that it discharges its goods onto the turn-table mesh as it passes over the cylindrical nosing rolls 27. Similarly, of course goods are discharged from the turn-table conveyer as it passes around the nosing rolls at the opposite side of the machine. In other words, as the band passes from its arcuate run over the nosing, its travel momentarily becomes linear, as in the straight run of the sorting table conveyer described above, and all portions of the band transversely advance at uniform speed. This novel action, available for the first time in the turn-table of this invention, is highly advantageous. It prevents damage to the soft surfaced goods received from and discharging onto the straight line conveyers, since at the moment of transfer the speeds of the delivering and receiving surfaces may be perfectly matched.

The deceleration of the outer edge of the band as it travels around the nosing is made possible by interlocking the outer ends of the rods 21 as loosely as intermediate the edges of the band, so that the necessary condensation of the edge of the conveyer can take place.

Fig. 9, at A, shows the normal tension play between adjacent wires 21 in the flat arcuate conveyer travel. As the band passes on to the nosing rollers 27 and the speed of its outer edge lessens to match the speed of the inner edge, the rods 21 are partially collapsed upon each other in their direction of travel, as shown at points B in Fig. 9, and conversely, as the mesh adjacent the peripheral edge of the conveyor leaves the cylindrical nosing its speed is increased and the normal tension between its interlocked elements 21 is restored.

To adapt this invention to direction-changing conveyers traveling through an arc of less than 180 degrees the endless mesh is assembled in the same way, but instead of being originally formed as a flat annular band, it takes the form of a truncated cone, the apex angle of which is more acute as the arc spanned by the conveyer is reduced.

Fig. 11 shows a 90 degree turn-table of this type, which is similar in construction and operation to the apparatus of Fig. 6 through 10. The conical form of the conveyer band 50 of the table is shown in Fig. 12, prior to flattening it over the arcuate frame of Fig. 11.

While I have shown and described specific embodiments of the invention, they are to be taken as preferred examples of the same. It is to be understood that modifications and changes in the structures shown may be made without departing from the scope of the appended claims.

For example, in the conveyer of Fig. 5, it may be advantageous under certain conditions to thread straight rods through those helically crimped wires 4 which are shown attached to the bars 10 on drive chain 9. The chain 8, by bars 10 or otherwise, may then be fastened to the straight reinforcing rods instead of directly to the crimped rod 4.

Referring to the turn-tables of Figs. 6 through 12, it may be desirable to match the diameter of the nosing roll or rolls 27 to that of the outer drive sprocket, 39, and provide slack between the bights of the rods 21 at and adjacent the inner edge of the band. In this case the inner edge of the conveyer will be opened out and momentarily accelerated when passing around the nosing to match the speed of the outer edge, in the same manner as the inner edge of the band of Fig. 4 is speeded up when traveling in a straight portion of the conveyer run. As a third possibility, the drive chain 39 may be located intermediate the edges of a turn-table conveyer, and on passing over a cylindrical nosing the outer and inner edge portions will be respectively retarded and accelerated to produce the desired uniform rate of advance across the width of the band at this loading or unloading point.

Modifications of the invention to particular installations will suggest themselves readily to the designer.

Having thus described my invention, what I claim and desire to secure by Letters Patent is:

1. Conveying apparatus comprising in combination a frame having arcuate guide members, rounded nosings of uniform radius mounted radially of the frame at both ends of the arcuate track, an endless annular belt carried by said frame and passing around said nosings and doubled upon itself to provide an arcuate conveying surface, said belt consisting of radially extending crimped rods, loosely interlocked at the crimps along and adjacent at least one edge, whereby said belt may be extended and collapsed circumferentially at and adjacent said edge, means for driving said belt through its arcuate path at uniform angular velocity and for carrying it around said nosings at linear velocity uniform throughout its width.

2. A conveying apparatus comprising a conveyer supporting frame having cylindrical nosings of uniform radius, at two edges, an endless annular conveyor band extended over and under said frame and passing around both of said nosings to provide an arcuate conveying surface, said band comprising radially extending crimped rods loosely interlocked at the crimps along and adjacent the outer edge of the band so that the band may be extended and collapsed circumferentially along said edge, an endless chain, concentric with said band and fixed thereto along its length in vertically offset relation, means on said frame for guiding said chain in an arcuate path, a driven sprocket journaled co-axially of one of said nosings at its outer end around which said chain passes, the radii of said sprocket and nosing being proportionate to the radii of the inner and outer edges respectively of the band, whereby the chain is driven by the sprocket at the speed of the outer edge of the band in its arcuate path while the outer edge of the mesh is collapsed and travels around the nosing at the same rate as the inner edge.

3. An endless single-ply belt made of helically coiled interconnected wires; said wires having their ends connected in pairs by bending back the free ends of the same into contact with one of the helices thereof whereby a loose connection is provided permitting the wires to collapse or contract longitudinally of the belt at either side or edge independently of the other side or edge.

4. An endless single ply belt made up of a series of helically coiled wires interconnected by screwing the same into each other; pairs of said wires throughout the extent of the belt having their free ends bent into engagement with helices thereof to provide loose connections for said ends that will permit contraction of the belt longitudinally of the same and at either side or edge independently of the other whereby said belt may move in a single plane and accommodate itself to curved paths in a similar plane.

EDWARD D. RAPISARDA.